C. G. DICKINSON.
Mowing Machine.
No. 31,229. Patented Jan. 29, 1861.
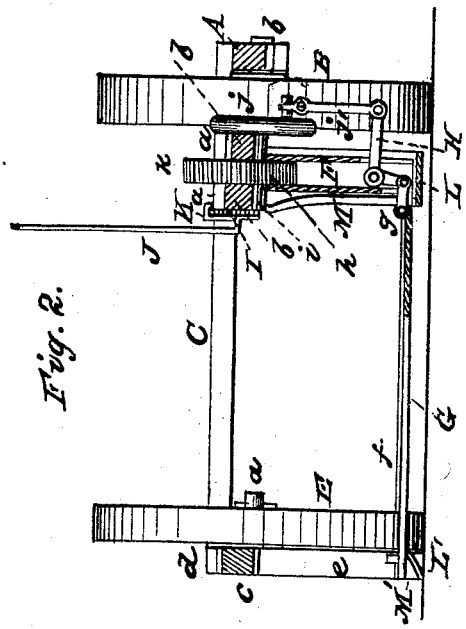
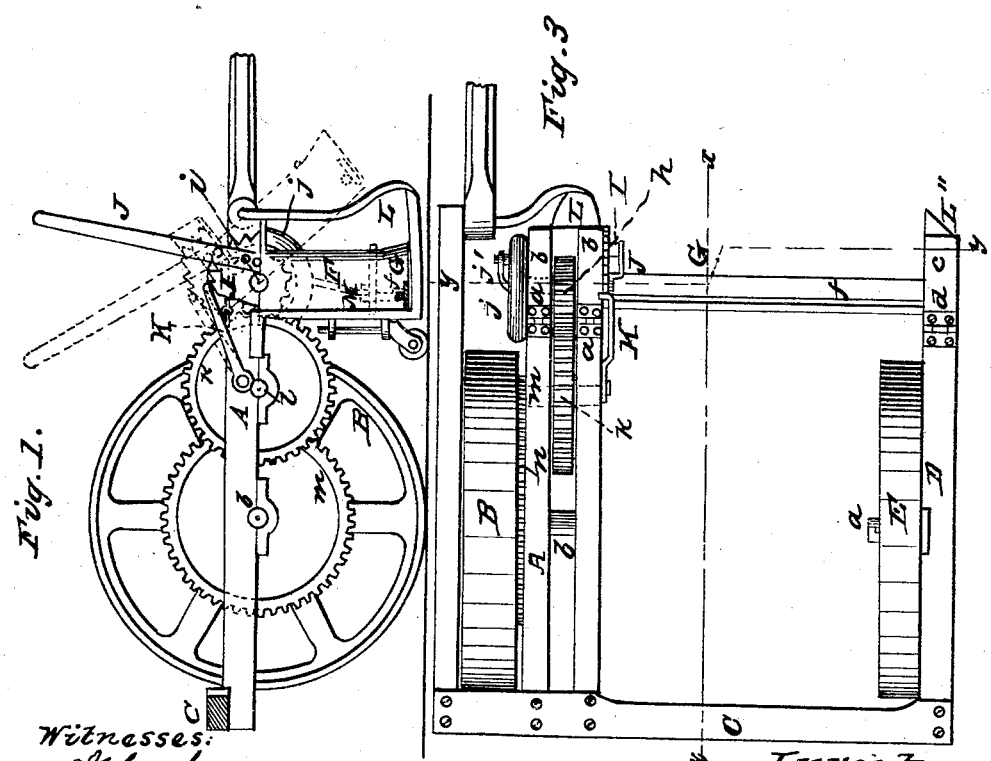

UNITED STATES PATENT OFFICE.

CHARLES G. DICKINSON, OF POUGHKEEPSIE, NEW YORK.

IMPROVEMENT IN HARVESTERS.

Specification forming part of Letters Patent No. 31,229, dated January 29, 1861.

*To all whom it may concern:*

Be it known that I, C. G. DICKINSON, of Poughkeepsie, in the county of Dutchess and State of New York, have invented a new and Improved Grain and Grass Harvester; and I do hereby declare that the following is a full, clear, and exact description of the same, reference being had to the annexed drawings, making a part of this specification, in which—

Figure 1 is a side sectional view of my invention, taken in the line $x\,x$, Fig. 3; Fig. 2, a front sectional view of the same, taken in the line $y\,y$, Fig. 3; Fig. 3, a plan or top view of the same.

Similar letters of reference indicate corresponding parts in the several figures.

The object of this invention is to obtain a simple, economical, and efficient means for elevating the finger-bar and sickle to enable them to pass over obstructions that may lie in their path, and also to enable the machine to be drawn from place to place, the parts being so arranged that the driving mechanism will be automatically thrown out of gear as the finger-bar and sickle are raised and thrown in gear as they are depressed or allowed to descend to their working position.

To enable those skilled in the art to fully understand and construct my invention, I will proceed to describe it.

A represents the main frame of the machine, which is of rectangular form, and has the driving-wheel B fitted within it. To the back part of the main frame A a bar, C, is attached at right angles, and to the outer end of bar C there is attached a bar, D, which is parallel to the frame A. The main frame A, with the bars C D, constitute the whole of the framing of the machine, and to the bar D a wheel, E, is affixed, the axle $a$ of which is in line with the axle $b$ of the wheel B. The wheels B E are of the same diameter; but the driving-wheel B is broader than the other, E, in Fig. 3, the driving-wheel being necessarily broad in order to obtain sufficient traction to drive the working parts.

To the front part of the main frame A there is attached by joints or hinges $a\,a$, two bars, $b\,b$, to the under side of which a tube, F, is secured, and a bar, $c$, is connected by a hinge or joint, $d$, to the front end of the bar D, the bar $c$ having a pendent plate, $e$, secured to it.

To the lower end of the plate $e$ and the tube F the finger-bar G is attached. This finger-bar may be constructed and arranged in the usual way, and therefore does not require a minute description.

The sickle is also placed on the finger-bar, as usual, and the sickle-bar $f$ is attached at one end by a link, $g$, to the lower part of a right-angle lever, H, which is fitted in the tube F at its lower part, as shown clearly in Fig. 2.

In the upper part of the tube F there is placed a pinion, $h$, the shaft $i$ of which projects through the sides of the tube. To one end of the shaft $i$ there is attached a fly-wheel, $j$, which also serves as a crank-wheel, and communicates motion to the lever H, and consequently to the sickle, by means of a connecting-rod, $j'$.

When the machine is at work, the pinion $h$ gears into a wheel, $k$, which is placed in the main frame A, and has on its shaft $l$ a pinion, $m$, into which a toothed rim, $n$, gears, the rim $n$ being attached concentrically to the driving-wheel B.

To the outer side of the inner bar, $a$, there is secured a toothed segment, I, and a lever, J, is also attached to said bar $a$.

K is a hook which is attached to the inner bar, $a$, and which may catch into either of the teeth of the segment I and retain the finger-bar and sickle at a greater or less height, as may be desired. The driver, it will be seen, may at any time, by grasping the lever J, elevate the finger-bar and sickle on account of the bars $a\,a$ and $c$ being connected to the main frame A and bar D by joints or hinges; and it will also be seen that when the parts aforesaid are elevated the pinion $h$ will leave the wheel $k$, and the sickle will be rendered inoperative, the pinion $h$ falling into gear with wheel $k$, when the finger-bar and sickle descend to their proper working position.

The shoes L L' may be attached to bars M M', secured, respectively, to the under side of the main frame A and bar D.

Having thus described my invention, what I claim as new, and desire to secure by Letters Patent, is—

The employment of the hinged tube F, in combination with the finger-bar G, sickle-bar f, lever H, pinions h i k, segment I, bar K, and lever J, when the above parts are constructed and arranged to operate substantially as herein shown and described.

CHARLES G. DICKINSON.

Witnesses:
JOHN McLEAN,
ADOLPH M. BRUSH.